July 18, 1950     R. P. HANNA     2,515,999

CONDUCTOR SWITCHING SYSTEM

Filed Oct. 12, 1945

WITNESSES:
E. A. M? Closkey.
F. V. Giolma

INVENTOR
Raymond P. Hanna,
BY G. M. Crawford
ATTORNEY

Patented July 18, 1950

2,515,999

UNITED STATES PATENT OFFICE 2,515,999

CONDUCTOR SWITCHING SYSTEM

Raymond P. Hanna, Wilkinsburg, Pa., assignor to Westinghouse Electric Corporation, East Pittsburgh, Pa., a corporation of Pennsylvania Application October 12, 1945, Serial No. 622,049

4 Claims. (Cl. 191—38)

My invention relates, generally, to control systems and it has reference, in particular, to control systems for electrically operated trolley frogs.

Generally stated, it is an object of my invention to provide a trolley frog control system which is simple and inexpensive to manufacture and is reliable and efficient in operation.

More specifically, it is an object of my invention to provide for presetting an electric frog at an intersection of the through and branch conductors to the direction of principal travel as the vehicle approaches the intersection, and to provide for selectively operating the frog to the direction of minimum travel when desired.

It is also an object of my invention to provide for preselecting the principal route at an intersection in a trolley conductor system as a vehicle approaches the intersection without requiring the operator of the vehicle to perform any operation.

Yet another object of my invention is to provide for automatically selecting the principal route as the vehicle approaches an intersection, and then selecting the minor route, if desired, without requiring interruption of the power supply of the vehicle.

An important object of my invention is to provide for so presetting an electric frog to a predetermined position as a vehicle approaches an intersection, as to reduce the number of operations of the trolley frog.

Other objects will, in part, be obvious and will, in part, be explained hereinafter.

In practicing my invention in one of its forms, a contact device is provided adjacent one of the through conductors in advance of an intersection between pairs of through and branch conductors to provide for energizing the operating winding of a pair of trolley frogs at the intersection to operate the frogs for guiding the current collectors of a vehicle along the principal route of travel. A pair of contact devices is provided intermediate the aforesaid contact device and the intersection for engaging the current collectors of the vehicle for selecting the minor route, only if the current collectors are disposed in a predetermined longitudinal relation indicating that the vehicle is turned in the direction of the minor route.

For a more complete understanding of the nature and objects of my invention, reference may be made to the following detailed description which may be studied in connection with the accompanying drawing, in which.

Figure 1:
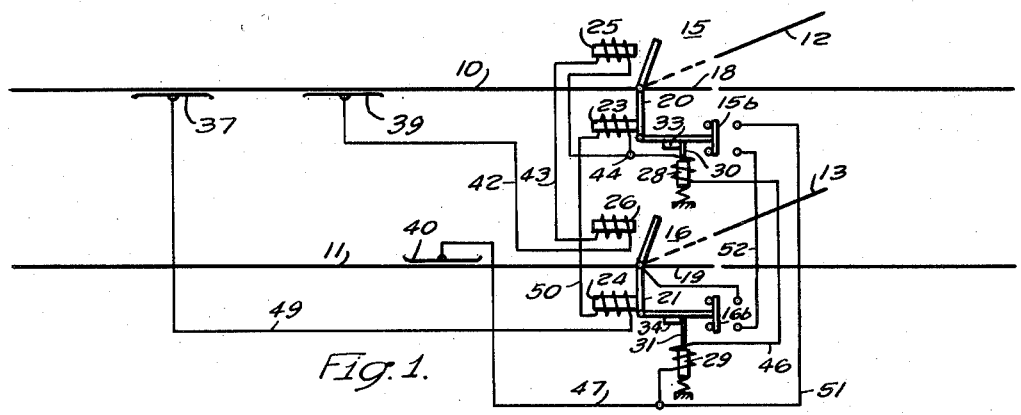
Figure 1 is a diagrammatic view of a trolley conductor control system arranged for preselecting the through conductors as the principal path.

Referring to Fig. 1, the reference numerals 10 and 11 may denote, generally, a pair of through conductors in a trolley conductor system which may be associated with branch conductors 12 and 13, respectively. A pair of trolley frogs 15 and 16 may be provided at the intersection for selectively determining the routes or paths of the current collectors of a vehicle along the conductors.

The trolley frogs 15 and 16 may comprise movable tongues 18 and 19 operatively connected to armatures 20 and 21 which may be actuated in the direction of the through or branch conductors by operating windings 23, 24 and 25, 26, respectively. Each of the trolley frogs may be provided with locking means for retaining the tongues thereof in the operated positions. For example, lock windings 28 and 29 may be provided for operating armatures 30 and 31 respectively, which interfere with projections 33 and 34 to retain the armatures in the positions to which they may be operated. Switch means comprising movable contact members 15b and 16b may be provided in connection with the trolley frogs for providing operating circuits for the operating windings 23 and 24 whenever the tongues 18 and 19 are operated in the direction of the branch conductors 12 and 13.

In order to provide for preselecting a path along the through conductors which may in this instance be considered as the principal route, a contact device 37 may be provided adjacent the through conductor 10 in advance of the intersection for engagement by a current collector (not shown) traversing this conductor. The contact device 37 may be connected to provide an energizing circuit for the operating windings 23 and 24 and the lock windings 28 and 29 through contact members 15b and 16b, which are normally in the open position whenever the tongues 18 and 19 of the trolley frogs are in alignment with the through conductors.

Additional contact devices 39 and 40 may be provided adjacent the conductors 10 and 11, respectively, and in skewed relation with the contact device 37. The contact device adjacent the through conductor on the side on which the branch conductors are located, in this case the contact device 39, is positioned in advance longitudinally of the contact device 40. These additional contact devices 39 and 40 may thus be connected in series circuit relation with the operating windings 25 and 26 and the lock windings 28 and 29 to provide for energizing these windings only when a vehicle approaching the intersection is positioned for making the turn in the direction of the branch conductors, whereby its current collectors will be also skewed so as to simultaneously engage the skewed contact devices 39 and 40.

With the tongues 18 and 19 of the trolley frogs in the position as shown, nothing happens when a current collector of a passing vehicle engages the contact device 37, since the circuit through the operating windings 23 and 24 is interrupted by the contact members 15b and 16b which are in the open position. If the vehicle is to proceed along the through conductors 10 and 11, it will be normally headed in that direction and its current collectors will be substantially opposite each other as they pass the contact devices 39 and 40. Since these contact devices are skewed, they are engaged by the current collectors at different times and no circuit is provided between them, so that the tongues 18 and 19 remain in the direction of the through conductors.

Should the operator desire to select the minor route and turn in the direction of the branch conductors 12 and 13, it is merely necessary to steer the vehicle in the direction of the branch conductors as it approaches the intersection. With the tongues 18 and 19 in the position shown, nothing happens as the current collectors traverse the contact device 37. However, when the current collectors, which will be also skewed due to the angular relation of the vehicle relative to the through conductors, engage the contact devices 39 and 40 substantially simultaneously, an energizing circuit is provided for the operating windings 25 and 26. This circuit extends from the contact device 39, which is connected to the conductor 10 by its associated current collector, through conductor 42, operating winding 26, conductor 43, operating winding 25, conductor 44, lock winding 28, conductor 46, lock winding 29, and conductor 47 to the contact device 40, which is connected to the conductor 11 by its associated current collector. Accordingly, the tongues 18 and 19 will be actuated to the position shown in dotted outline for directing the current collectors of the vehicle along the branch conductors 12 and 13.

When the current collector of the next vehicle approaching the intersection engages the contact device 37, an energizing circuit is provided for the operating windings 23 and 24 to return the tongues 18 and 19 to a position in alignment with the through conductors. This circuit extends from the conductor 10 through contact device 37, conductor 49, operating winding 24, conductor 50, operating winding 23, conductor 44, lock winding 28, conductor 46, lock winding 29, conductor 51, contact member 15b, conductor 52, contact member 16b to the through conductor 11. Should the vehicle be proceeding in the direction of the through conductors, no further operation is necessary. If the vehicle is turned in the direction of the branch conductors, the tongues 18 and 19 will be actuated in the direction of the branch conductors when the current collectors of the vehicle engage the contact devices 39 and 40 as described hereinbefore.

Figure 2:
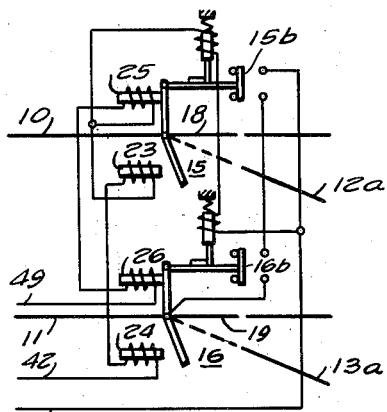
Fig. 2 is a partial diagrammatic view of a trolley conductor control system similar to that shown in Fig. 1 but arranged with the branch conductors on the other side of the through conductors.

Referring to Fig. 2, it will be seen that the branch conductors 12a and 13a are on the opposite side of the through conductors 10 and 11 from that shown in Fig. 1. Accordingly, the operating windings 23 and 24 may be connected to the contact devices 39 and 40 by means of conductors 42 and 47 instead of being connected to the contact device 37 for effecting preselection as was the case in connection with the system of Fig. 1. The operating windings 25 and 26 may instead be connected in series circuit relation with the contact members 15b and 16b and the contact device 37 through conductor 49. The lock windings 28 and 29 are connected in series relation with the operating windings in each instance in the manner shown in Fig. 1. It will be noted that with the tongues 18 and 19 in alignment with the through conductors 10 and 11, the contact members 15b and 16b again are in the open circuit position.

It will be apparent that since the contact devices 39 and 40 must be skewed so as to provide for simultaneous engagement with the current collectors of a vehicle which is turning in the direction of the branch conductors, the longitudinal positioning of the current collectors 39 and 40, which are not shown in Fig. 2, must be reversed, so that contact device 40 which is adjacent the through conductor 11 is positioned in advance of the contact device 39, since the contact device which is on the side to which the branch conductors diverge must always be in advance of the other contact device. In other respects the system of Fig. 2 is the same as shown in Fig. 1.

Figure 3:
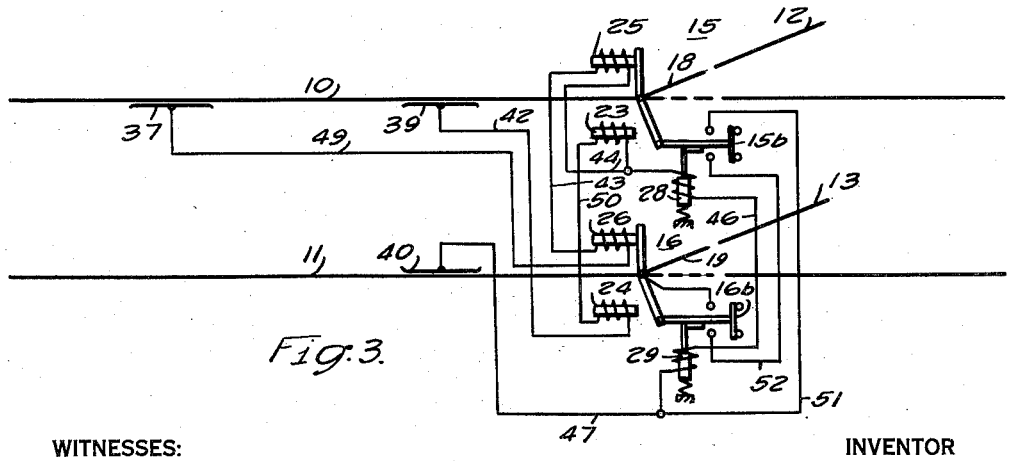
Fig. 3 is a diagrammatic view of a trolley conductor control system arranged for selecting the branch conductors as the principal route.

Referring to Fig. 3, the reference numerals 15 and 16 may again designate trolley frogs positioned at the intersection of through conductors 10, 11 and branch conductors 12 and 13. In order to provide for normally directing the current collectors of a vehicle in the direction of the branch conductors which are, in this case, considered as the principal path, the operating windings 25 and 26 may be connected in series circuit relation with the lock windings 28 and 29 and connected by means of conductor 49 to the contact device 37. The contact members 15b and 16b of the trolley frog switch means may be disposed in this instance to provide an operating circuit for the operating windings 25 and 26 whenever the tongues 18 and 19 of the trolley frogs are positioned in the direction of the through conductors. The contact devices 39 and 40 may be positioned in substantially the same relative longitudinal positions adjacent their respective conductors for substantially simultaneous engagement between current collectors of a vehicle which is positioned for proceeding in the direction of the through conductors. By connecting the contact devices 39 and 40 in series circuit relation with the operating windings 23 and 24, the tongues 18 and 19 may be selectively operated to through position when the contact devices 39 and 40 are simultaneously engaged by the current collectors of a vehicle.

With the tongues 18 and 19 in the position shown, nothing happens when the current collector of a vehicle engages the contact device 37 since the energizing circuit for the operating windings 25 and 26 is open at contact members 15b and 16b. Should the vehicle be turning in the direction of the branch conductors 12 and 13, its current collectors will be skewed, and accordingly no circuit will be provided for the operating windings 23 and 24 when the current collectors pass the contact devices 39 and 40. The vehicle thus readily passes through the intersection in the direction of the branch conductors.

Should the vehicle be positioned for proceeding along the through conductors, its current collectors will be in substantially the same relative longitudinal positions. Accordingly, as the current collectors pass the contact devices 39 and 40, an energizing circuit will be provided for the operating windings 23 and 24 extending from the conductor 10, through contact device 39, conductor 42, operating winding 24, conductor 50, operating winding 23, lock winding 28, conductor 46, lock winding 29, conductor 47 to contact device 40, and conductor 11. Accordingly, the tongues 18 and 19 are moved into alignment with the through conductors 10 and 11.

When the current collector of a subsequent vehicle engages the contact device 37, an energizing circuit is provided for the operating windings 25 and 26 of the trolley frogs. This circuit extends from conductor 10, through contact device 37, conductor 49, operating winding 26, conductor 43, operating winding 25, conductor 44, lock winding 28, conductor 46, lock winding 29, conductor 51, contact member 15b, conductor 52, contact member 16b to through conductor 11. The tongues 18 and 19 are, accordingly, actuated in the direction of the principal path in alignment with the branch conductors 12 and 13. If the vehicle is proceeding in the direction of the branch conductors, no further operations take place and if it is proceeding in the direction of the through conductors, the tongues 18 and 19 are subsequently operated in the manner hereinbefore described into alignment with the through conductors 10 and 11.

Figure 4:
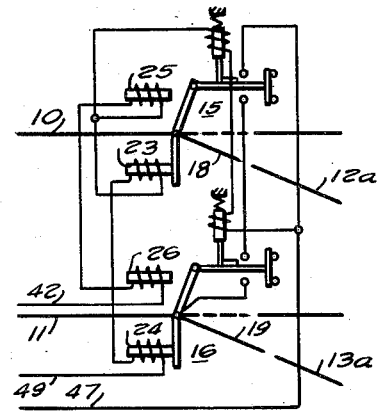
Fig. 4 is a partial diagrammatic view of a trolley conductor control system similar to that shown in Fig. 3 but with the branch conductors on the other side of the through conductors.

Referring to Fig. 4, the reference numerals 15 and 16 designate as hereinbefore trolley frogs at an intersection between through conductors 10, 11 and branch conductors 12a and 13a. The branch conductors 12a and 13a, it will be noted, are on the opposite sides of the through conductors from those shown in Fig. 3. In most respects, the arrangement shown in Fig. 4, is similar to that shown in Fig. 3 except for the different connections of the operating windings 23, 24, and 25, 26 which are necessary to provide for operating the tongues 18 and 19 to the desired positions. Accordingly, the operating windings 23 and 24 may be connected by the conductor 49 to the contact device 37 (not shown) for preselecting the position of the tongues 18 and 19 in alignment with the branch conductors 12a and 13a respectively. The operating windings 25 and 26 may be connected by means of conductors 42 and 47 to the contact devices 39 and 40 for selectively operating the tongues 18 and 19 into alignment with the through conductors when desired. The operation for the system of Fig. 4 is substantially similar to that described in connection with the system shown in Fig. 3.

From the above description and the accompanying description and the accompanying drawing, it will be apparent that I have provided in a simple and effective manner for controlling the operation of trolley frogs in the intersection of through and branch conductors in an overheated trolley conductor system. By preselecting the principal path as the vehicle approaches the intersection, the number of operations of the trolley frogs is reduced to a minimum and the operating position of the tongues is made more certain. By preselecting the position of the trolley frog tongues as the vehicle approaches the intersection, errors due to false operations of the tongues are minimized. Failure to select the proper path due to dewirements after the current collector has passed through the intersection is prevented.

Since certain changes may be made in the above-described construction and different embodiments of the invention may be made without departing from the spirit or scope thereof, it is intended that all the matter contained in the above description and shown in the accompanying drawings shall be considered as illustrative and not in a limiting sense.

I claim as my invention:

1. A switching system comprising, a pair of trolley frogs operable to guide the current collectors of a vehicle along a pair of through conductors or onto a pair of branch conductors, first circuit means including control means positioned in advance of the trolley frogs operable to effect energization of the trolley frogs to operate them to a predetermined position, additional circuit means including only a single pair of contact members responsive to the relative longitudinal positioning of the current collectors corresponding to other than said position effective to operate the frogs to said other position, and switch means actuated by the frogs connected in circuit relation with said first circuit means to prevent energization of the frogs thereby to operate them to the predetermined position when they are already in said position.

2. A switching system for through and branch conductors comprising, a pair of trolley frogs each having a pair of operating windings for operating the frogs to different positions to guide current collectors along the through or branch conductors and auxiliary switch means operable to provide an open circuit in response to operation of the frog to one of said positions and a closed circuit in response to operation of the frog to said other position, circuit means including a contact member associated with one of the main conductors and said auxiliary switch means connected to provide an energizing circuit for the operating windings for operating said frogs to said one position only when said frogs are in the other position, and a single pair only of contact devices associated with the main conductors intermediate the frogs and the aforesaid contact member in such longitudinal relation that they only provide an energizing circuit for the other operating windings when the current collectors are longitudinally positioned in accordance with angular positioning of the vehicle to proceed in the other direction.

3. A switching system comprising, a pair of trolley frogs having tongues movable to different positions and operating windings energizable to move them to guide a pair of current collectors either along a pair of through conductors or onto a pair of branch conductors, circuit means including a single contact device positioned adjacent only on of said main conductors ahead of the trolley frogs and connected by engagement with a current collector to effect energization of one operating winding of each frog to preset the frogs for guiding the collectors along the main conductors, and additional circuit means including only a single pair of longitudinally displaced contact devices so positioned as to be simultaneously engaged by the current collectors of a vehicle turning in the direction of the branch conductors connecting the other operating winding of the trolley frogs to select the branch direction.

4. A switching system comprising, a pair of trolley frogs having tongues movable to different positions to guide current collectors either along a pair of through conductors or onto a pair of branch conductors constituting a principal path and each having a pair of operating windings energizable to actuate the tongues to said different positions, switch means operable to the open position in response to movement of the tongues to the principal path, only a single contact means positioned adjacent only one of the through conductors ahead of the trolley frogs for engagement by one of the current collectors, circuit means including said contact means and the switch means disposed to connect one of the operating windings of each trolley frog for automatically operating the tongues to guide the current collectors along the branch conductors, and additional circuit means including a single pair of contact devices disposed adjacent the through conductors in similar longitudinal relation intermediate the aforesaid contact means and the trolley frogs for engagement by the current collectors to connect the other operating windings to operate the tongues to direct the current collectors along the through conductors.

RAYMOND P. HANNA.

REFERENCES CITED

The following references are of record in the file of this patent:

UNITED STATES PATENTS

| Number | Name | Date |
|---|---|---|
| 1,962,546 | Woolley, Jr., et al. | June 12, 1934 |
| 2,020,924 | Wahlberg et al. | Nov. 12, 1935 |
| 2,264,839 | Holden | Dec. 2, 1941 |
| 2,337,827 | Lewis | Dec. 28, 1943 |